United States Patent
Zhu et al.

(10) Patent No.: US 10,666,755 B2
(45) Date of Patent: May 26, 2020

(54) METHOD AND APPARATUS FOR SECURE CONTENT CACHING AND DELIVERY (71) Applicant: TELEFONAKTIEBOLAGET LM ERICSSON (PUBL), Stockholm (SE)

(72) Inventors: Zhongwen Zhu, Saint-Laurent (CA); Makan Pourzandi, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 146 days.

(21) Appl. No.: 15/758,203

(22) PCT Filed: Oct. 23, 2015

(86) PCT No.: PCT/IB2015/058204
§ 371 (c)(1),
(2) Date: Mar. 7, 2018

(87) PCT Pub. No.: WO2017/068399
PCT Pub. Date: Apr. 27, 2017

(65) Prior Publication Data
US 2018/0248969 A1 Aug. 30, 2018

(51) Int. Cl.
*H04L 29/08* (2006.01)
*H04L 29/06* (2006.01)
(Continued)

(52) U.S. Cl.
CPC ........ *H04L 67/2842* (2013.01); *H04L 9/085* (2013.01); *H04L 9/0838* (2013.01);
(Continued)

(58) Field of Classification Search
CPC ... H04L 67/2842; H04L 9/085; H04L 9/3213; H04L 63/0442; H04L 63/0478; H04L 63/061; H04N 21/23106
See application file for complete search history.

(56) References Cited

U.S. PATENT DOCUMENTS 6,516,412 B2 * 2/2003 Wasilewski ............ H04L 63/04
348/E5.004
8,855,317 B2 10/2014 Rong et al.
(Continued)

FOREIGN PATENT DOCUMENTS

EP 2779523 A1 9/2014

OTHER PUBLICATIONS

Giuseppe Ateniese et al.: "Improved Proxy Re-Encryption Schemes with Applications to Secure Distributed Storage"; 25 pages., ACM Transactions on Information and System Security (TISSEC), vol. 9 Issue 1, Feb. 2006.
(Continued)

Primary Examiner — Nasser M Goodarzi
Assistant Examiner — Adil Ocak
(74) Attorney, Agent, or Firm — Julie Dufort; Ericsson Canada Inc.

(57) ABSTRACT

The invention is directed to secure content delivery. A device (10) sends (4) a content request to a CP (14) identifying targeted content and a public key (K PUB) of the device. A response (8) identifies a Content Delivery Network (18-1, 18-2), CDN, and includes an authorization token (TOKEN A) and a content key (K-NEW) derived from the public key of the communication device and a private key of the CP. The authorization token is sent (10) to the CDN and a delivery token (TOKEN B) and delivery node address are received (15). The delivery token and content key are sent (18) to the delivery node and encrypted content is received (30), the encrypted content comprises content as initially encrypted by the CP and as further encrypted by the CDN using the content key. The encrypted content is decrypted (31) using a private key of the device (10).

24 Claims, 8 Drawing Sheets (51) Int. Cl.
    *H04N 21/6377*     (2011.01)
    *H04L 9/08*     (2006.01)
    *H04L 9/32*     (2006.01)
    *H04N 21/231*     (2011.01)

(52) U.S. Cl.
    CPC ........ *H04L 9/3213* (2013.01); *H04L 63/0442* (2013.01); *H04L 63/0478* (2013.01); *H04L 63/061* (2013.01); *H04N 21/23106* (2013.01); *H04N 21/63775* (2013.01); *H04L 2209/601* (2013.01)

(56) References Cited

U.S. PATENT DOCUMENTS

| | | | |
|---|---|---|---|
| 2004/0093419 A1 | 5/2004 | Weihl et al. | |
| 2005/0027991 A1* | 2/2005 | DiFonzo | G06F 21/10 713/185 |
| 2005/0278259 A1* | 12/2005 | Gunaseelan | G06F 21/10 705/59 |
| 2009/0210697 A1 | 8/2009 | Chen et al. | |
| 2012/0131333 A1* | 5/2012 | Zhang | H04L 9/0825 713/156 |
| 2012/0317655 A1 | 12/2012 | Zhang et al. | |
| 2014/0006773 A1 | 1/2014 | Chazalet et al. | |
| 2016/0127895 A1* | 5/2016 | Bangole | H04W 12/04 380/279 |

OTHER PUBLICATIONS

M. Jones et al.: "JSON Web Token (JWT)"; May 2015, 20 pages.
Respond to e-mails; Dec. 2014, uploaded from the Internet on Nov. 3, 2015; 2 pages.

\* cited by examiner

METHOD AND APPARATUS FOR SECURE CONTENT CACHING AND DELIVERY

TECHNICAL FIELD

There is provided a method and apparatus for secure content caching and delivery to a communication device.

BACKGROUND

In current content delivery networks, Hypertext Transfer Protocol (HTTP) is used as a main delivery mechanism. Since the asset, or data such as a title or content, is delivered in a non-secure environment, this allows the delivery node to verify the asset. Then, the delivery node can decide to cache the asset based upon the content verification. In this way, the delivery node can serve the same asset to different subscribers. This leads to a significant reduction in the round trip from the client to server, which improves the user experience.

The Internet Engineering Steering Group (IESG)/Internet Engineering Task Force (IETF) has recently released HTTP 2, within which, Transport Layer Security (TLS) is mandatory for HTTP traffic. This means that in the future, content will be delivered via an end-to-end secure connection. Major browsers are being developed to support the new standard.

SUMMARY

According to some embodiments, a method of operation implemented by a communication device of a subscriber configured for operation in a communication network includes sending a content request to a CP system reachable via the communication network, the content request identifying targeted content, such as a video, and including a public key of the communication device. The method includes receiving a response from the CP system that identifies a CDN and includes an authorization token and a content key that is derived from the public key of the communication device and a private key of the CP system. The method also includes sending the authorization token to the CDN and correspondingly receiving a delivery token and an address of a DN. The method then includes sending the delivery token and the content key to the DN and correspondingly receiving encrypted content from the DN, the encrypted content comprising at least a portion of the targeted content as initially encrypted by the CP using a public key of the CP, and as further encrypted by the CDN using the content key provided by the communication device. The method then includes decrypting the encrypted content using a private key of the communication device, to obtain decrypted content for media playback at the communication device of the subscriber.

According to some embodiments, a communication device of a subscriber configured for operation in a communication network includes communication interface circuitry configured to send signals to the communication network and receive signals from the communication network. The communication device also includes processing circuitry operatively associated with the communication interface. The processing circuitry is configured to send a content request to a CP system reachable via the communication network, the content request identifying targeted content and including a public key of the communication device. The processing circuitry is also configured to receive a response from the CP system identifying a CDN and including an authorization token and a content key that is derived from the public key of the communication device and a private key of the CP system. The processing circuitry is configured to send the authorization token to the CDN and correspondingly receive a delivery token and an address of a DN. The processing circuitry is configured to send the delivery token and the content key to the DN and correspondingly receive encrypted content from the DN, the encrypted content comprising at least a portion of the targeted content as initially encrypted by the CP using a public key of the CP, and as further encrypted by the CDN using the content key provided by the communication device. The processing circuitry is configured to decrypt the encrypted content using a private key of the communication device, to obtain decrypted content for media playback at the communication device.

According to some embodiments, a method of operation in a CDN implemented by one or more nodes of the CDN includes receiving a request for targeted content, wherein the request originates from a communication device of a subscriber operating in a communication network that includes or is in communication with the CDN, and wherein the request includes an authorization token associated with a CP system. The method includes verifying the authorization token and, conditioned upon verification of the authorization token, selecting a DN within the CDN, for use in delivering the targeted content to the communication device and sending a delivery token to the communication device, for return submission by the communication device to the selected DN. The delivery token and a content key are subsequently received from the communication device at the selected DN, the content key being derived by the CP system using a public key of the CP system. The delivery token is verified and, conditioned upon verification of the delivery token, encrypted content is generated comprising at least a portion of the targeted content, based on obtaining initially-encrypted content that is encrypted by the CP system using a private key of the CP system and a public key of the communication device and the initially-encrypted content is further encrypted using the content key and sent to the communication device.

According to some embodiments, a CDN includes first communication interface circuitry configured to receive a request for targeted content, wherein the request originates from a communication device operating in a communication network that includes or is in communication with the CDN, and wherein the request includes an authorization token associated with a CP system. The CDN also includes first processing circuitry operatively associated with the first communication interface circuitry and configured to verify the authorization token. Conditioned upon verification of the authorization token, the first processing circuitry selects a DN within the CDN, for use in delivering the targeted content to the communication device, and sends a delivery token to the communication device, for return submission by the communication device to the selected DN. The CDN also includes second communication interface circuitry configured to receive the delivery token and a content key, as subsequently submitted to the CDN by the communication device, the content key being derived by the CP system using a public key of the CP system. The CDN includes second processing circuitry operatively associated with the second communication interface circuitry and configured to verify the delivery token. Conditioned upon verification of the delivery token, the second processing circuitry generates encrypted content comprising at least a portion of the targeted content, based on obtaining initially-encrypted content that is encrypted by the CP system using a private key of the CP system and a public key of the communication device. The second processing circuitry further encrypts the initially-encrypted content using the content key and sends the encrypted content to the communication device.

Further embodiments may include computer program products and non-transitory computer readable media that store instructions that, when executed by processing circuit, perform the operations of the embodiments describe above.

DETAILED DESCRIPTION

If end-to-end secure connections are to be used as specified for HTTP 2, by nature, all the intermediate nodes cannot cache and route traffic in a traditional way. This is because those intermediate nodes have no way to know the content within the packets. All the packets look different and hence there is no value in caching the content in the delivery node (DN).

Determining how content delivery networks (CDNs) can deliver encrypted content to end users (subscribers) so that network traffic can be offloaded can be beneficial. At the same time, subscribers and content providers (CPs) do not want to reveal their business approaches, profiles and service habits. There is an increasing demand on the operator to be blind to the content served to the subscribers. Accordingly, some embodiments provide encrypted file system/caching mechanisms that do not reveal information to the operators.

In some embodiments, a CP is responsible for encrypting all the data that is going to be delivered to its subscribers. Targeted content, such as a movie file, is encrypted by the CP with its public key and stored in a CDN. Based upon the request for the movie file from a subscriber, the CP retrieves the subscriber's public key, and generates a new key, or a content key, based on the subscriber's public key and the CP's own private key. This content key is passed to a delivery node DN of the CDN via the subscriber. The DN re-encrypts the encrypted movie file using this content key and delivers it to the subscriber. The subscriber can decrypt the encrypted movie file using its private key. In this way, CDNs do not have the ability to know what is in the encrypted file. The CDNs can be deployed inside or outside of an operator network. In the case of internal deployment, the DN is much closer to the subscribers since the operator owns the access network. Various embodiments described herein allow CPs to select different CDNs to deliver targeted content to its subscribers in a secure way. The secure key management is provided by the operator network, where the interfaces use secure HTTP (HTTPS), as an example.

In addition to the use of the new content key, targeted content can be securely delivered using authorization and content delivery tokens. A CP generates an authorization token using a secret shared between the CDN and the CP system, and the CP gives the authorization token to the subscriber so that the subscriber enables the CDN to send a delivery token to the subscriber. The CDN generates a delivery token using a secret shared between a request routing node (request router or RR) of the CDN and a DN of the CDN selected by the RR. The RR gives the delivery token to the subscriber so that the subscriber can authorize the selected DN to provide the targeted content to the subscriber.

Figure 1:
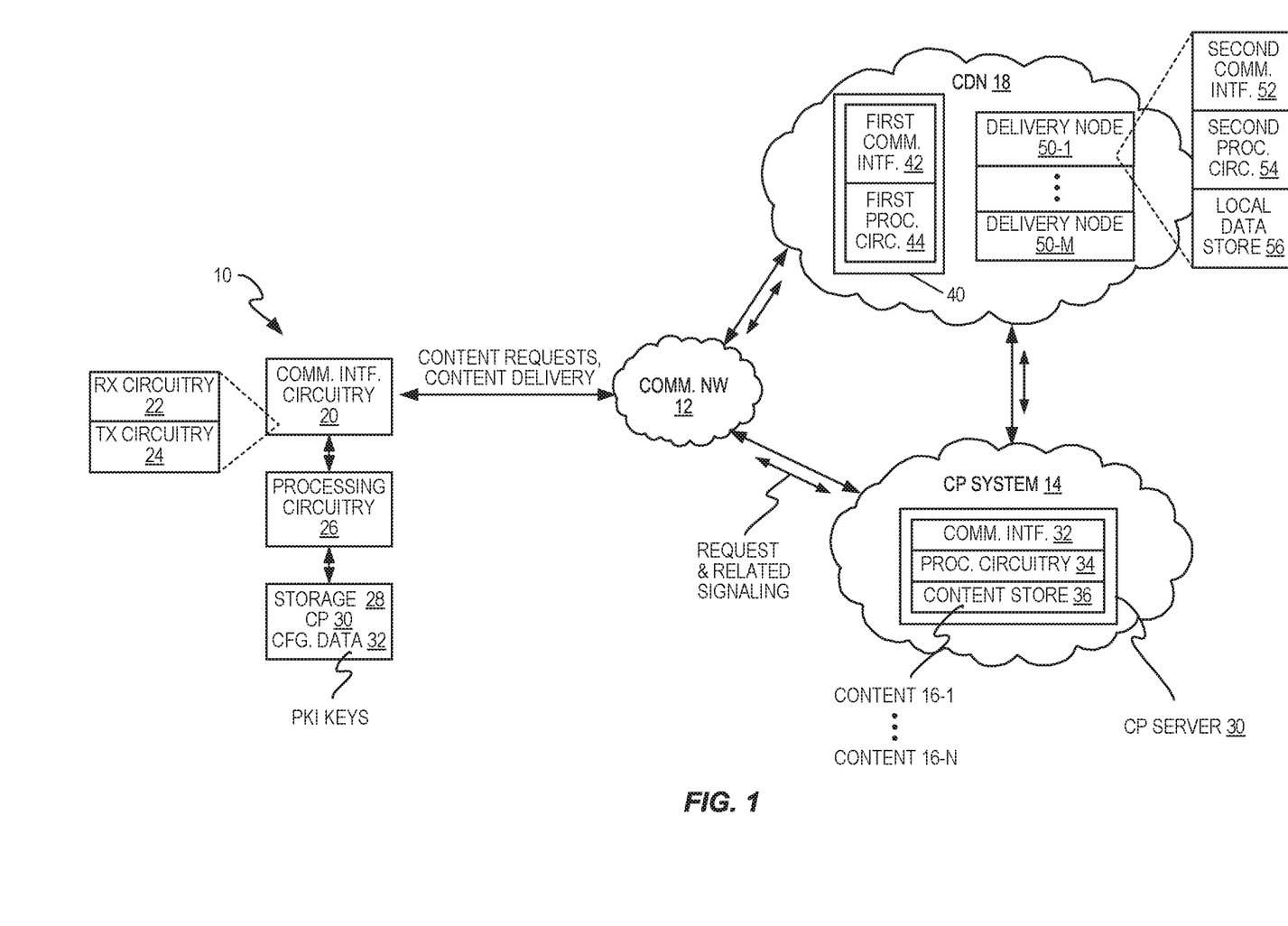
FIG. 1 is a block diagram of one embodiment of a communication device, a communication network, a content delivery network, and a content provider system.

FIG. 1 illustrates an example communication device 10, an example CP system 14 and an example CDN 18 that communicate over a communication network 12 and that are configured according to the teachings herein. The communication device 10 is, for example, a user equipment (UE) of a subscriber or any other computing device that communicates with the CP system 14, the CDN 18 and/or other communication devices over communication network 12. The communication device 10 includes processing circuitry 26, communication interface circuitry 20 and storage 28. The CDN 18 comprises a request router (RR) 40 that includes first communication circuitry 42 and first processing circuitry 44. The CDN 18 also includes one or more delivery nodes (DNs) 50-1 to 50-M, each DN 50 including second communication interface circuitry 52, second processing circuitry 54 and local data store 56. The CP system 14 includes one or more CP servers 30, which each include communication interface circuitry 32, processing circuitry 34 and a content store 36.

The communication interface circuitry 20 of communication device 10 includes transceiver circuitry such as receiver circuitry 22 and transmission circuitry 24 for communication with other communication devices, routers and nodes with or without communication network 12. The communication interface circuitry 20 and the supporting control and configuration of the processing circuitry 26 may permit the communication device 10 to communicate using wired and/or wireless computer networks, including using more than one Radio Access Technology (RAT). For example, the communication device may support multiple cellular RATs, such as Wideband Code Division Multiple Access (WCDMA) and Long Term Evolution (LTE), and may additionally support non-cellular RATs, such as Near Field Communications (NFC), Device-to-Device communications (D2D), IEEE 802.11 Wi-Fi™ protocols, Bluetooth® protocols, etc. The communication device may also be configured for operation in a Public Land Mobile Network (PLMN).

The processing circuitry 26 of the communication device 10 may comprise more than one processing circuit. For example, the processing circuitry 26 includes one or more microprocessors, microcontrollers, Digital Signal Processors or DSPs, Application Specific Integrated Circuits or ASICs, Field Programmable Gate Arrays or FPGAs, or Complex Programmable Logic Devices or CPLDs. In general, the processing circuitry 26 comprises appropriately configured digital processing circuitry and includes or is associated with supporting circuits, such as clock circuitry, power control circuitry, input/output circuitry, and interface circuitry interfacing the processing circuitry 26 to the communication interface circuitry 20, e.g., for data and control signaling transmission, data and control signaling reception, configuration control, signal strength measurements, etc.

The processing circuitry 26 may, in general, comprise one or more fixed circuits, one or more programmed circuits, or any mix thereof. In at least one embodiment, the processing circuitry 26 is specially adapted to carry out any of the communication device-side processing operations taught herein, based on its execution of computer program instructions stored in a computer readable medium in or accessible to the processing circuitry 26.

In an example embodiment, the storage 28 provides non-transitory storage for a computer program 30 and configuration data 32. Here, "non-transitory" means that the storage 28 provides for permanent, semi-permanent, or at least temporarily persistent storage for the computer program 30 and, as such, it encompasses non-volatile and/or volatile, working-memory storage of the computer program instructions comprising the computer program 30. The same is true for the configuration data 32, which may be preconfigured data, dynamically determined data, or some mix thereof. The storage 28 comprises at least one type of computer-readable medium and may comprise a mix of types. Non-limiting example types of storage circuits or devices include a hard disk, a solid-state disk or SSD, FLASH memory, EEPROM or ROM memory, and DRAM and/or SRAM with or without battery backup.

In some embodiments, the processing circuitry 26 is configured to operate the communication device 10 in the communication network 12 and send a content request to a CP system 14 reachable via the communication network 12, the content request identifying targeted content and including a public key of the communication device 10. The processing circuitry is configured to receive a response from the CP system 14 that identifies a CDN and includes an authorization token and a new key, or content key, that is derived from the public key of the communication device 10 and a private key of the CP system 14. The processing circuitry 26 is also configured to send the authorization token to the CDN 18 and correspondingly receive a delivery token and an address of a DN 50. The processing circuitry 26 is configured to send the delivery token and the content key to the DN 50 and correspondingly receive encrypted content from the DN 50, the encrypted content comprising at least a portion of the targeted content as initially encrypted by the CP using a public key of the CP, and as further encrypted by the CDN 18 using the content key provided by the communication device 10. The processing circuitry 26 of communication device 10 is configured to decrypt the encrypted content using a private key of the communication device 10, to obtain decrypted content for media playback at the communication device 10.

Turning to the CDN 18, the first communication interface circuitry 42 in the RR 40 of the CDN 18 includes circuitry for communication with other communication devices, routers and nodes with or without communication network 12. The first communication interface circuitry 42 and the supporting control and configuration of the first processing circuitry 44 may permit the communication device 10 to communicate using wired and/or wireless computer networks.

The first processing circuitry 44 of the CDN 18 may comprise more than one processing circuit. For example, the first processing circuitry 44 includes one or more microprocessors, microcontrollers, Digital Signal Processors or DSPs, Application Specific Integrated Circuits or ASICs, Field Programmable Gate Arrays or FPGAs, or Complex Programmable Logic Devices or CPLDs. In general, the first processing circuitry 44 comprises appropriately configured digital processing circuitry and includes or is associated with supporting circuits, such as clock circuitry, power control circuitry, input/output circuitry, and interface circuitry interfacing the first processing circuitry 44 to the first communication interface circuitry 42, e.g., for data and control signaling transmission, data and control signaling reception, configuration control, signal strength measurements, etc.

The first processing circuitry 44 may, in general, comprise one or more fixed circuits, one or more programmed circuits, or any mix thereof. In at least one embodiment, the first processing circuitry 44 is specially adapted to carry out any of the RR 40 operations of the CDN-side processing operations taught herein, based on its execution of computer program instructions stored in a computer readable medium in or accessible to the first processing circuitry 44. The second processing circuitry 54 is specially adapted to carry out any of the DN 50 operations of the CDN-side processing operations taught herein, based on its execution of computer program instructions stored in a computer readable medium, such as local data store 56, in or accessible to the second processing circuitry 54. In an example embodiment, the local data store 56 may be any mix of storage circuits or devices include a hard disk, a solid-state disk or SSD, FLASH memory, EEPROM or ROM memory, and DRAM and/or SRAM with or without battery backup. The local data store 56 provides non-transitory storage for a computer program and configuration data.

In some embodiments, the first processing circuitry 44 of the CDN 18 is configured to receive a request for targeted content, wherein the request originates from a communication device 10 operating in a communication network 12 that includes, is communicatively coupled to, or in communication with the CDN 18, and wherein the request includes an authorization token associated with a CP system 14. The first processing circuitry 44 of the RR 40 of the CDN 18 is operatively associated with the first communication interface circuitry 42 and configured to verify the authorization token. Upon verification of the authorization token, the first processing circuitry 44 is configured to select a DN 50 within the CDN 18 for use in delivering the targeted content to the communication device 10 and send a delivery token to the communication device 10, for return submission by the communication device 10 to the selected DN 50.

The second communication interface circuitry 52 of the selected DN 50 of the CDN 18 is configured to receive the delivery token and a content key, as subsequently submitted to the CDN 18 by the communication device 10, the content key being derived by the CP system 14 using a private key of the CP system 14 and a public key of the communication device 10. The second processing circuitry 54 is operatively associated with the second communication interface circuitry 52 and configured to verify the delivery token. Upon verification of the delivery token, the second processing circuitry 54 is configured to generate encrypted content comprising at least a portion of the targeted content, based on obtaining initially-encrypted content that is encrypted by the CP system 14 using a public key of the CP system 14, and to further encrypt the initially-encrypted content using the content key. The second processing circuitry 54 is also configured to send the encrypted content to the communication device 10.

Figure 2:
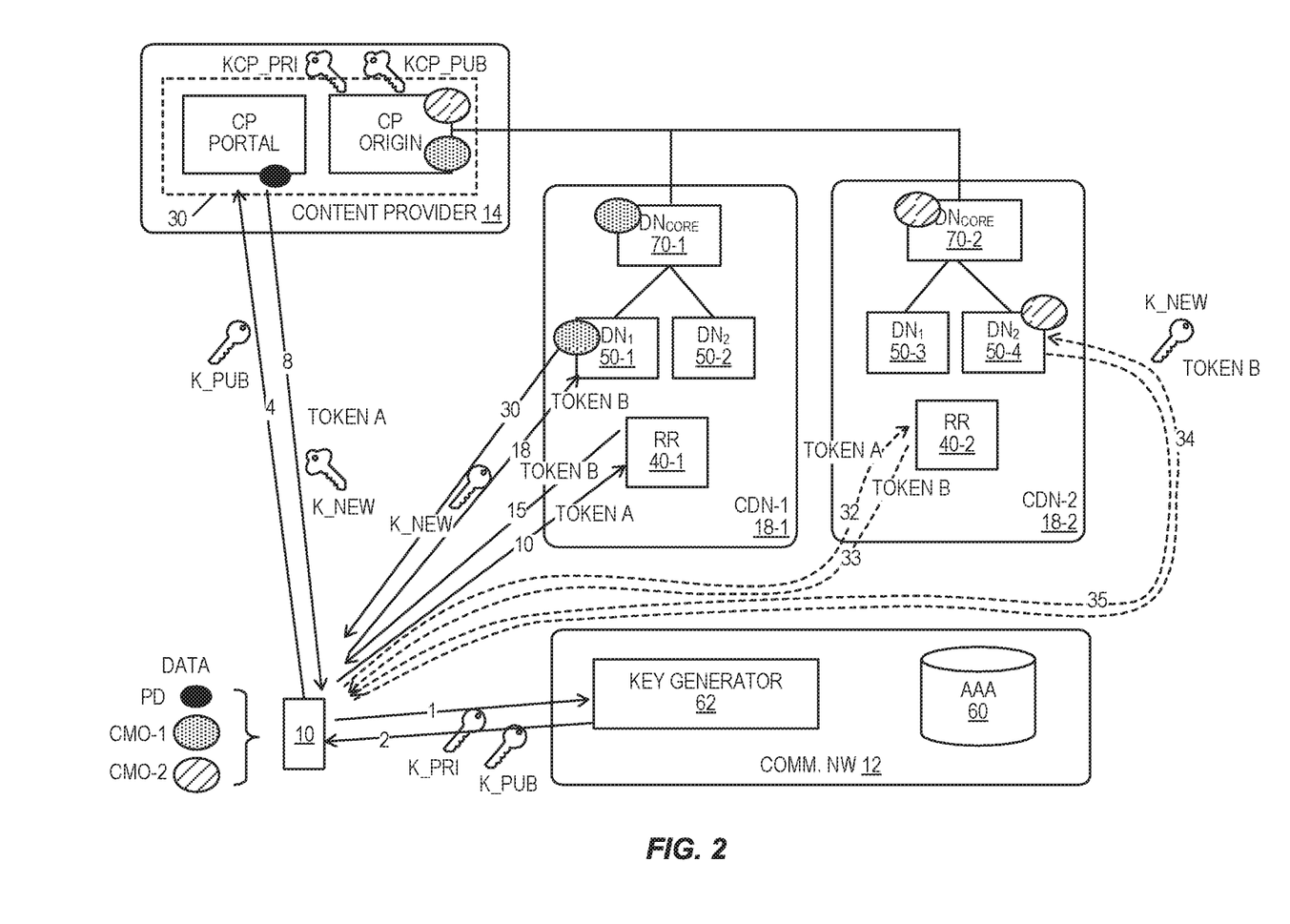
FIG. 2 is a block diagram of one embodiment of a communication device, a communication network, a content delivery network, and a content provider system, with respect to the generation and exchange of encryption keys and tokens for content delivery to the communication device.
Figure 3A:
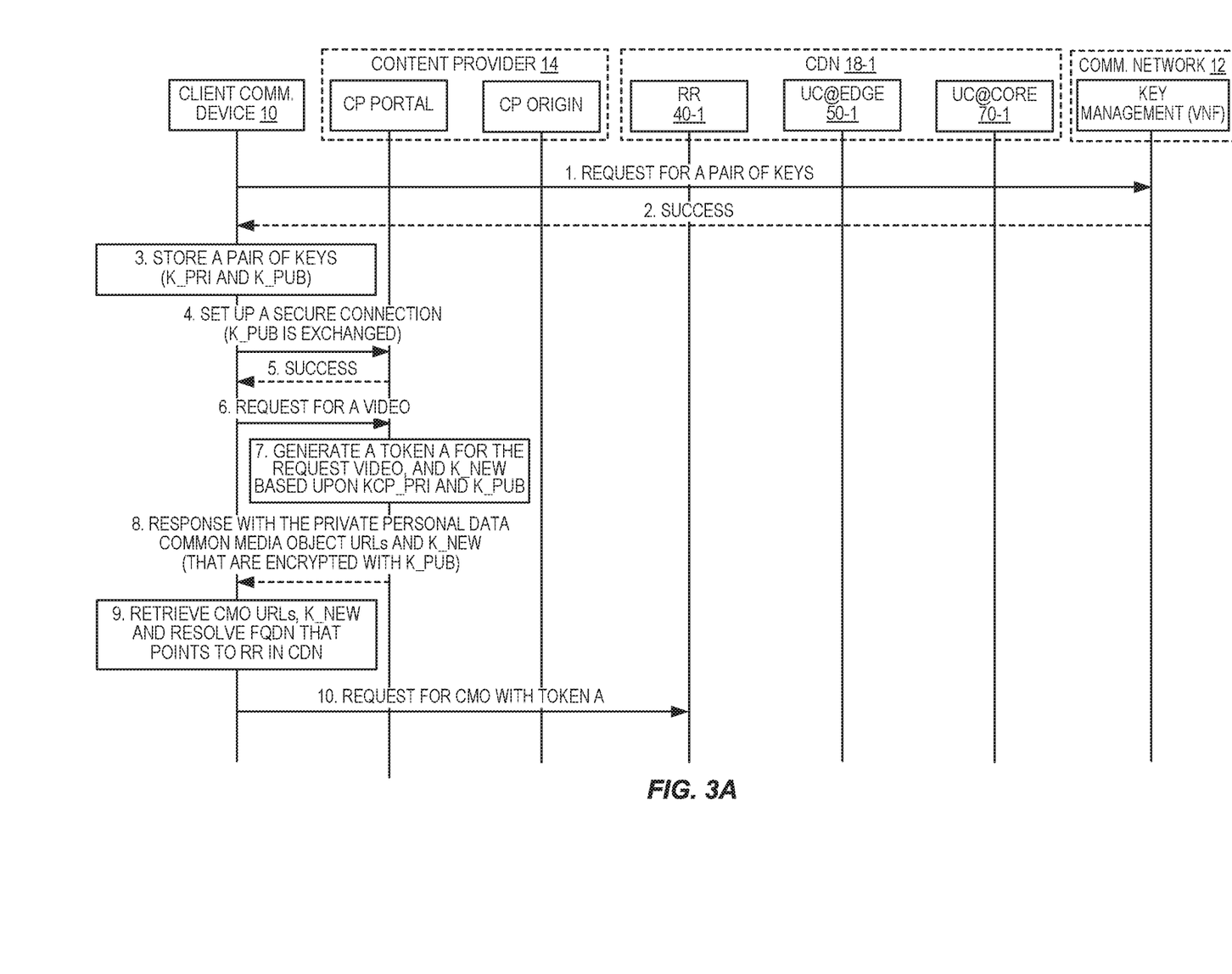
FIGS. 3a to 3c is a call flow or signal flow diagram illustrating example signaling between a communication device, a communication network, a content delivery network, and a content provider system, with respect to content delivery to the communication device.
Figure 3B:
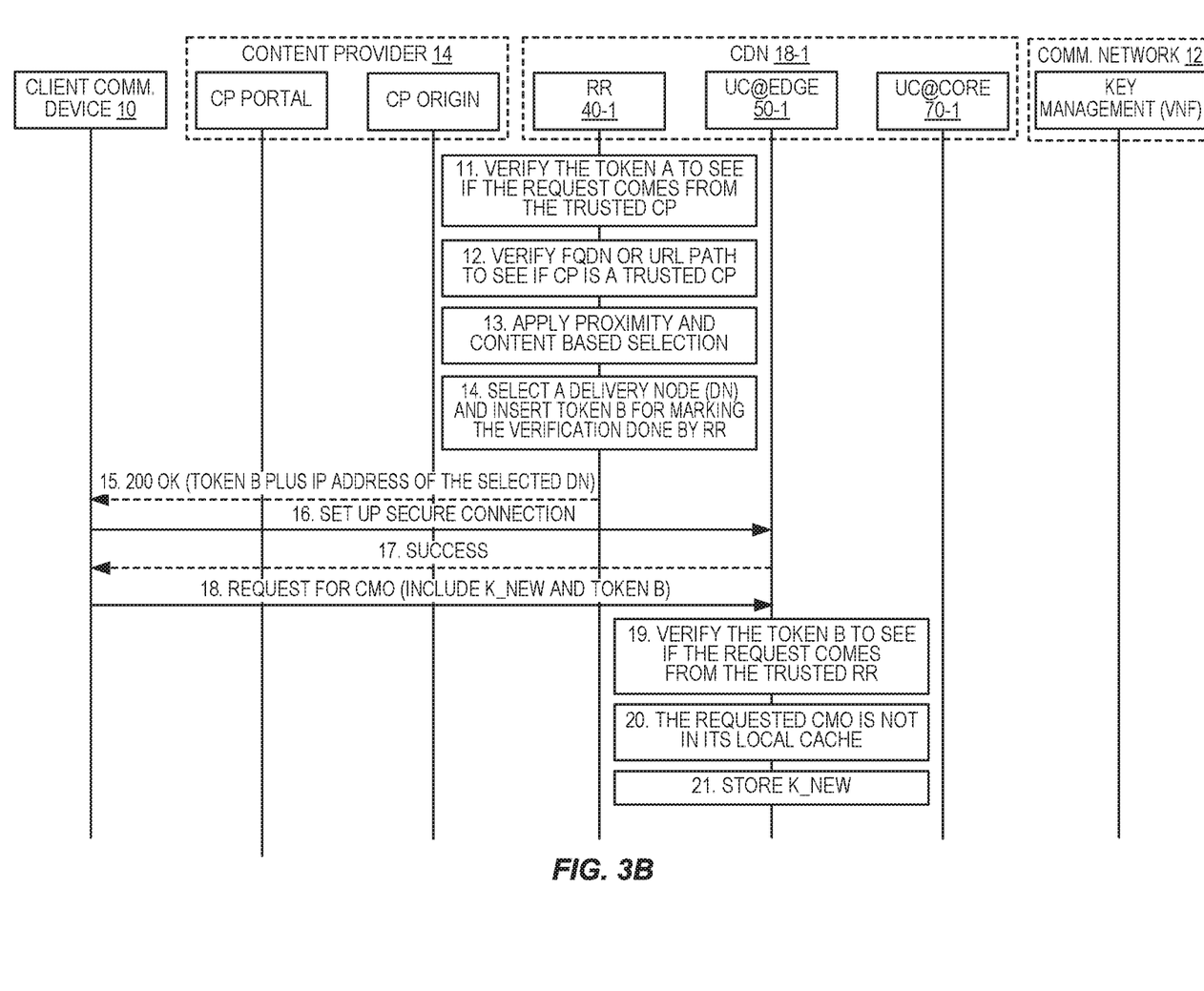
Figure 3C:
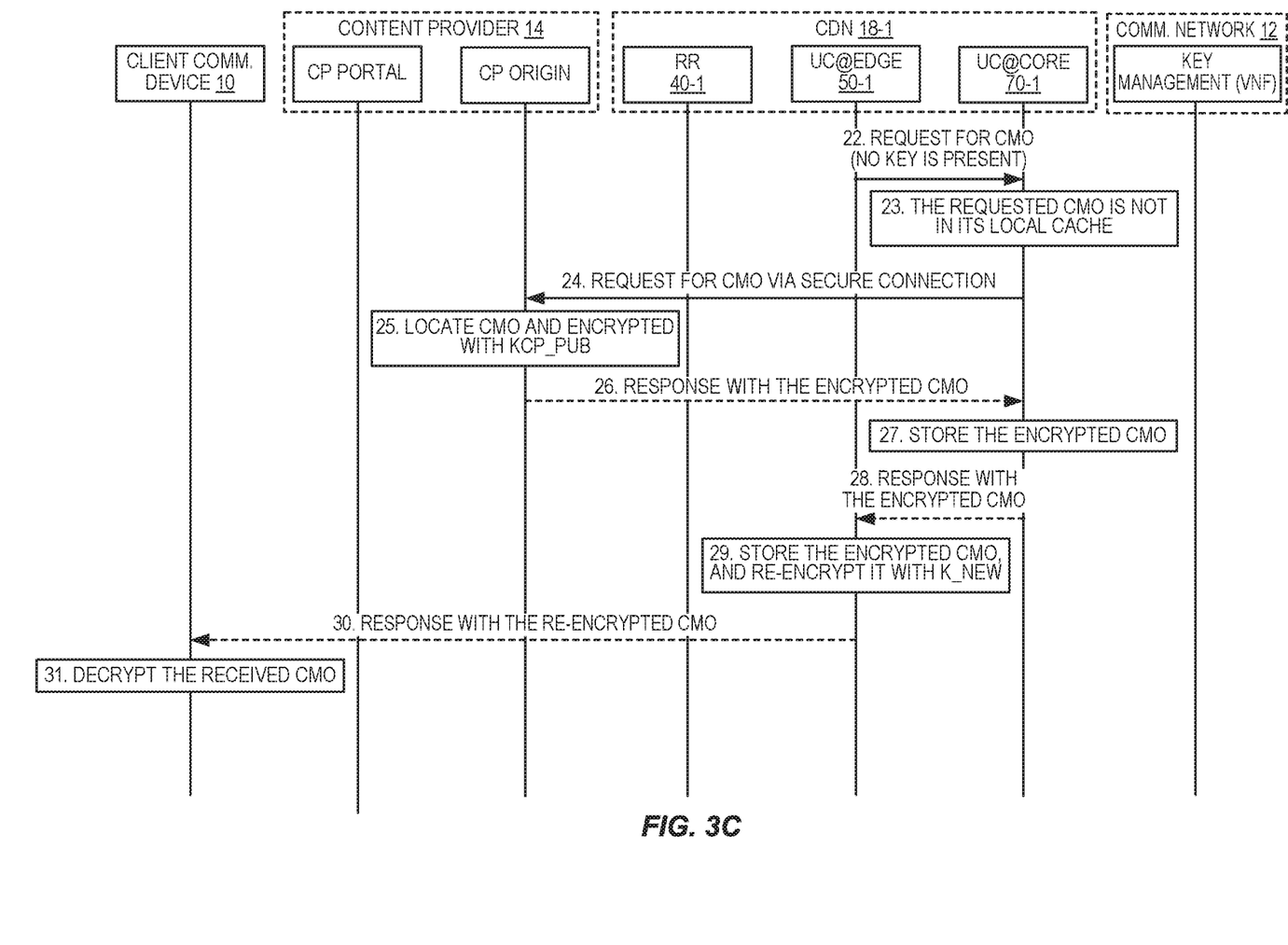

FIGS. 2 and 3 will be used to explain an example implementation. FIG. 2 illustrates an overall block diagram of an architecture that includes the communication device 10 in communication with the CP system 14, which is also in communication with multiple CDNs, such as CDN 18-1 and CDN 18-2. The CDN 18-1 includes two layers of DNs, a core DN 70-1 and serving edge DNs 50-1 and 50-2. The CDN 18-1 also includes a request router (RR) 40-1. Likewise, the CDN 18-2 includes a core DN 70-2 serving DNs 50-3 and 50-4. The CDN 18-2 also includes an RR 40-2. Communication network 12 includes a key generator 62 and an access, authentication and authorization (AAA) node 60. FIG. 3 shows a sequential flow of the steps involving the elements illustrated in FIG. 2.

For any service provided by a content provider (CP) to its subscribers, the data communication is essential. The data delivered from the central server to its subscribers can be put into two categories, personal data or common data. Personal data, such as application usage, profile, personal credit information, cannot be shared. Common data, such as a movie file or a software update, can be shared with some or all of the CP's subscribers. In general, personal data is different from one subscriber to another, and its size is limited. Personal data does not require high network bandwidth to be sent from the content provider server to the subscriber's device. Hence, it can be delivered directly from the CP system 14 to the communication device 10.

Common data is normally larger in size and requires high network bandwidth to be delivered. The CDN 18 is considered as the main network element to deliver the common data. To utilize the CDN network more efficiently, the common data has to be cached in the DNs 50. In order to facilitate caching and delivering of the data, a common media object (CMO) is introduced to repackage a large media file into several manageable CMOs. The CP uses a public/private key pair to encrypt the CMOs. Each CMO is encrypted with a CP public key and it has a unique identifier or URL assigned. CMOs with the same identifier have the same content.

Embodiments described herein deliver CMOs to the service subscribers in a secure way. According to some embodiments, a mechanism can be described in the following steps, which are shown sequentially in FIGS. 2 and 3. At step 1, the communication device 10 requests a pair of keys, public and private, from the communication network 12. At step 2, the keys that are generated by key generator 62 are received by the communication device 10.

At step 3, the public key (K_pub) and the private key (K_pri) are stored at the communication device 10. At step 4, a secure connection is established with the CP system 14 using the public key (K_pub). Upon success, at step 5, data, such as a video, is requested by the subscriber through communication device 10 at step 6. The communication device 10 of the subscriber sends its public key (K_pub) to the CP system 14 upon requesting the video. In preparation for such a request, the CP system 14 packages media files (either offline prior to any request or in response to a request), including the requested video, into one or more CMOs, such as CMO-1 and CMO-2. The CP origin, provided by a software program 30 executed by the processing circuitry 26 of the CP system 14, encrypts those CMOs using the public key (Kcp_pub) of the CP system 14. The CP system 14 has also selected a CDN 18-1 to deliver those CMOs. This selection can also be done dynamically upon a request from a subscriber, in some embodiments.

The computer program 30 of the CP system 14 also provides a CP portal to receive a public key (K_pub) from the communication device 10. At step 7, the CP portal generates a new key, or content key (K_new), based upon its private key (Kcp_pri) and the communication device's 10 public key (K_pub), and a token A for the video.

The generation of the new key by the CP system 14 lends itself to a contextual discussion of proxy re-encryption (PRE) usage. From a high-level point of view, PRE is a mechanism, involving cryptographic algorithms, that is generally used when a sender B wants to reveal the contents of messages or files, sent to him and encrypted with his public key, to a third party C without revealing his private key to third party C. Accordingly, sender B could designate a proxy to re-encrypt one of his messages that is to be sent to third party C. In addition, sender B does not want the proxy to be able to read the contents of his messages. This generates a new key that third party C can use to decrypt the message. Now, if the receiver A sends a message to B that was encrypted under the sender B's public key, the proxy will alter the message, allowing third party C to decrypt it with the new key. This method allows for a number of applications such as e-mail forwarding, law-enforcement monitoring, and content distribution.

Conceptually, delegation allows receiver A (keyholder) to generate a re-encryption key that is used by a proxy to re-encrypt an already encrypted message sent by sender B into a new encrypted message for a delegatee C. In doing so, delegatee C will be able to decrypt the message sent by sender B to receiver A without seeing receiver A's private key. In other words, receiver A delegates her encryption/decryption rights to delegatee C so that delegatee C can read messages sent to receiver A by sender B. Receiver A is thus the delegator.

According to some embodiments, the CP system 14 has the role of delegator A, the subscriber at communication device 10 has the role of delegatee C, and the CDN 18 has the role of the proxy re-encryptor. In contrast to the normal PRE approach, where a sender and a receiver exist as separate entities, the CP system 14 according to various embodiments assumes the role of both sender B and receiver A. In this way, the CP system 14 can send a file encrypted with its public key (Kcp_pub) to itself. In this schema, only the CP system 14 can decrypt the encrypted file with its own private key (Kcp_pi). This means that the operator/CDN 18 cannot read this file. Some advantages of the embodiments involve the way re-encryption is used in this instance. That is, the CP system's 14 own public key is used to encrypt its own messages. This differs from the normal way that PRE is used. This encryption is later used to delegate the CP system's reading/decrypting files to the subscriber at communication device 10.

Continuing with the example implementation in FIG. 2, at step 8 the CP system 14 returns the content key (K_new) back to the communication device 10, with the token A authorizing access to the video file or corresponding CMO (s). The CP system 14 may also return an IP address of the RR 40-1 in the selected CDN 18-1. Note that this is different from normal PRE, where the new re-encryption key is sent instead to the re-encryption proxy. The response may include the CMO URLs (uniform resource locators) and private personal data. At step 9, the communication device 10 retrieves the CMO URLs and the content key (K_new). If necessary, the communication device 10 resolves the fully qualified domain name (FQDN) to identify the RR 40 in the CDN 18 selected by the CP system 14.

At step 10, the communication device 10 sends the request with token A to the RR 40-1 in the selected CDN 18-1 to fetch the video, or the CMO(s) of the video. The CDN 18-1 receives the re-encryption key from the communication device 10. Step 11 includes verification by the RR 40-1 of token A. After successful authentication is performed for token A, step 12 includes verifying the FQDN or URL to determine whether the CP is trusted. Step 13 includes proximity and content based selection. At step 14, the RR 40-1 selects a DN 50-1 that is able to serve the subscriber at that time, and generates token B for marking the verification performed by the RR 40-1. At step 15, the token B and the IP address of the selected DN 50-1 are returned to the communication device 10.

At steps 16 and 17, a secure connection is set up successfully. At step 18, the communication device 10 sends the request with the content key (K_new) and token B to the selected DN 50-1. At step 19, the DN 50-1 validates token B for accessing the requested CMO-1, to ensure the request comes from the trusted RR 40-1.

As illustrated by steps 20-28, if the CMO is not in the local cache of the DN 50-1, the content key (K_new) is stored and the CMO is requested from core DN 70-1. This core DN 70-1 requests the CMO from the CP origin of the CP system 14, which returns the CMO encrypted with the public key of the CP system 14 (Kcp_pub). The core DN 70-1 stores the encrypted CMO. By step 28, the encrypted CMO is passed to the requesting DN 50-1. At step 29, the encrypted CMO is stored at the DN 50-1. Also at step 29, the DN 50-1 re-encrypts the requested movie (one or more CMOs) with the content key (K_new) and sends the CMO-1 to the communication device 10 at step 30. Instead of sending the CMO-1, the DN 50-1 could alternately allow download, streaming or other forms of transmission to the communication device 10. At step 31, the subscriber 10 receives the CMO-1 and decrypts it using its private key. Note that the content key (K_new) may have an expiration time; the content key (K_new) in this case may expire by the time the CMO-1 is decrypted.

In another embodiment, the video may be made up of a CMO-1 stored at the DN 50-1 and a CMO-2 stored at the DN 50-4. In this case, token A may be used to request the CMO-2 of the movie from RR 40-2 of CDN 18-2, at step 32. Token B can be returned at step 33. At steps 34 and 35, the token B is used with the content key to obtain the CMO-2, which is returned by the DN 50-4.

In contrast to normal PRE where the individual messages are sent to the delegators, who are also the receivers, the approach of some embodiments modifies this schema in order to be able to send encrypted files to many delegatees, or many communication devices 10. In essence, the receiver/delegator to delegatee scheme of the normal PRE system is modified by various embodiments into a scheme of one delegator (CP system 14) to many delegatees (communication devices 10) and from an individual based message exchange system into a public encrypted file system. Note that for this modified PRE, the roles of sender, receiver, delegator and delegatee are mixed between the CP system 14 and the subscriber at communication device 10. The CP system 14, according to various embodiments, is sender A and receiver B at the same time. Delegatee C is the subscriber at communication device 10 and the PRE provides the CP system 14 to be sender and receiver of the messages and communication device 10 to be the delegatee C who reads the messages. This modified PRE system allows caching encrypted content and handling related encrypted requests.

Figure 4:
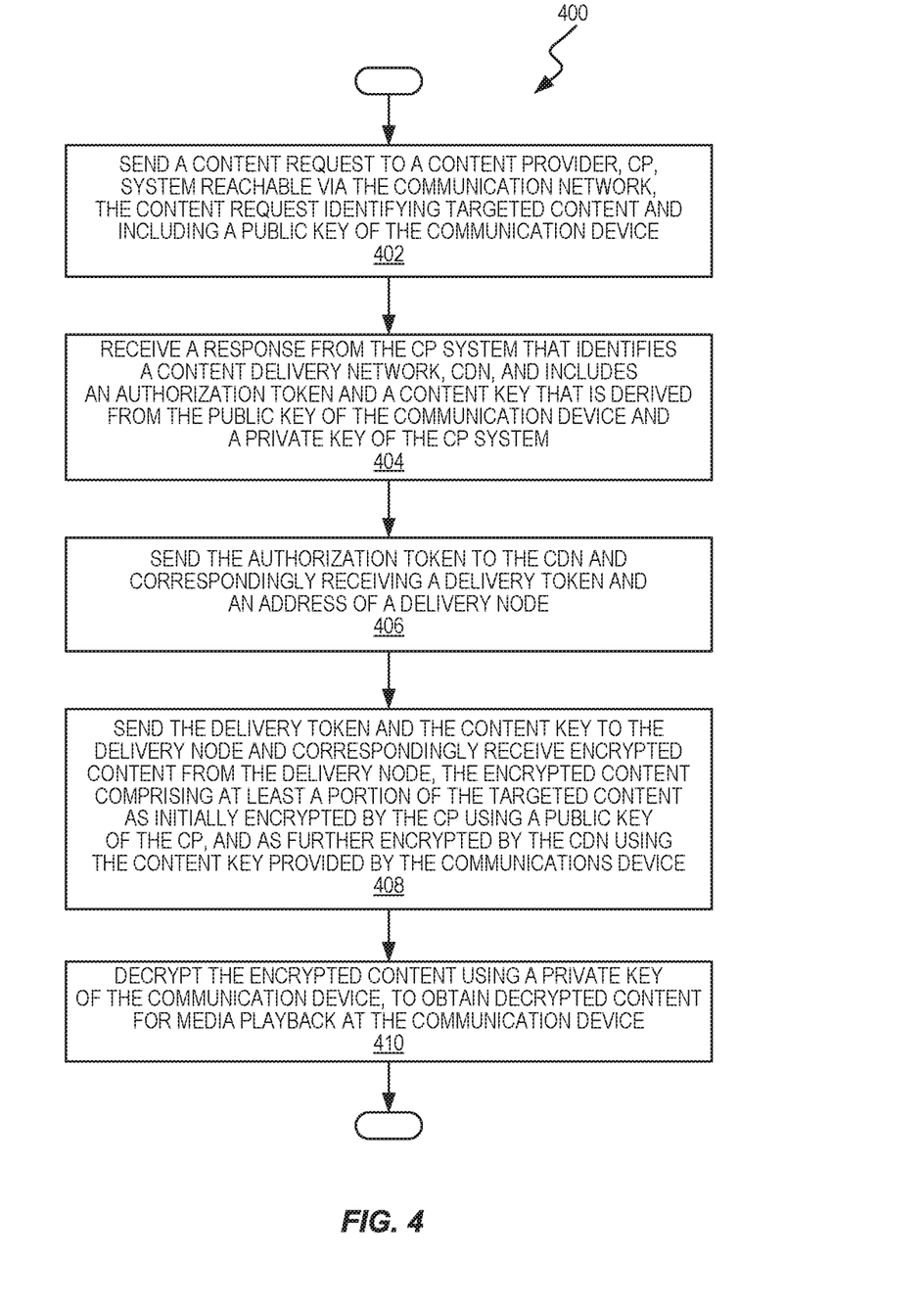
FIG. 4 is a logic flow diagram of one embodiment of a method of processing implemented by a communication device, for obtaining content from a content provider system, as delivered from a content delivery network.

Regardless of its implementation details, the communication device 10 in one or more embodiments is configured to perform a method 400 such as shown in FIG. 4. The method 400 includes sending a content request to a CP system 14 reachable via the communication network, the content request identifying targeted content and including a public key of the communication device 10 (Block 402). Sending the content request to the CP system 14 may include performing a public key exchange with the CP system 14 and correspondingly establishing a secure connection to the CP system 14, and sending the content request over the secure connection to the CP system 14. The method 400 also includes receiving a response from the CP system 14 that identifies a CDN 18 and includes an authorization token and a content key that is derived from the public key of the communication device 10 and a private key of the CP system 14 (Block 404).

The method 400 also includes sending the delivery token and the content key to the DN 50 and correspondingly receive encrypted content from the DN 50, the encrypted content comprising at least a portion of the targeted content as initially encrypted by the CP using a public key of the CP, and as further encrypted by the CDN 18 using the content key provided by the communications device 10 (Block 406). Sending the delivery token and the content key to the DN 50 may include establishing a secure connection to the DN 50, and sending the delivery token and the content key over the secure connection to the DN 50. In some cases, the CP system 14 packages the targeted content as one or more CMOs, each CMO being separately encrypted by the CP system 14 and having a corresponding authorization token, content key, and DN association. The DN association may include information associating the respective CMO to one or more DNs 50, which may authorize delivery of the respective CMO upon verification of the content key. The method 400 may then include sending the authorization token and the delivery token on a per-CMO basis.

The method 400 also includes decrypting the encrypted content using a private key of the communication device, to obtain decrypted content for media playback at the communication device (Block 408).

Figure 5A:
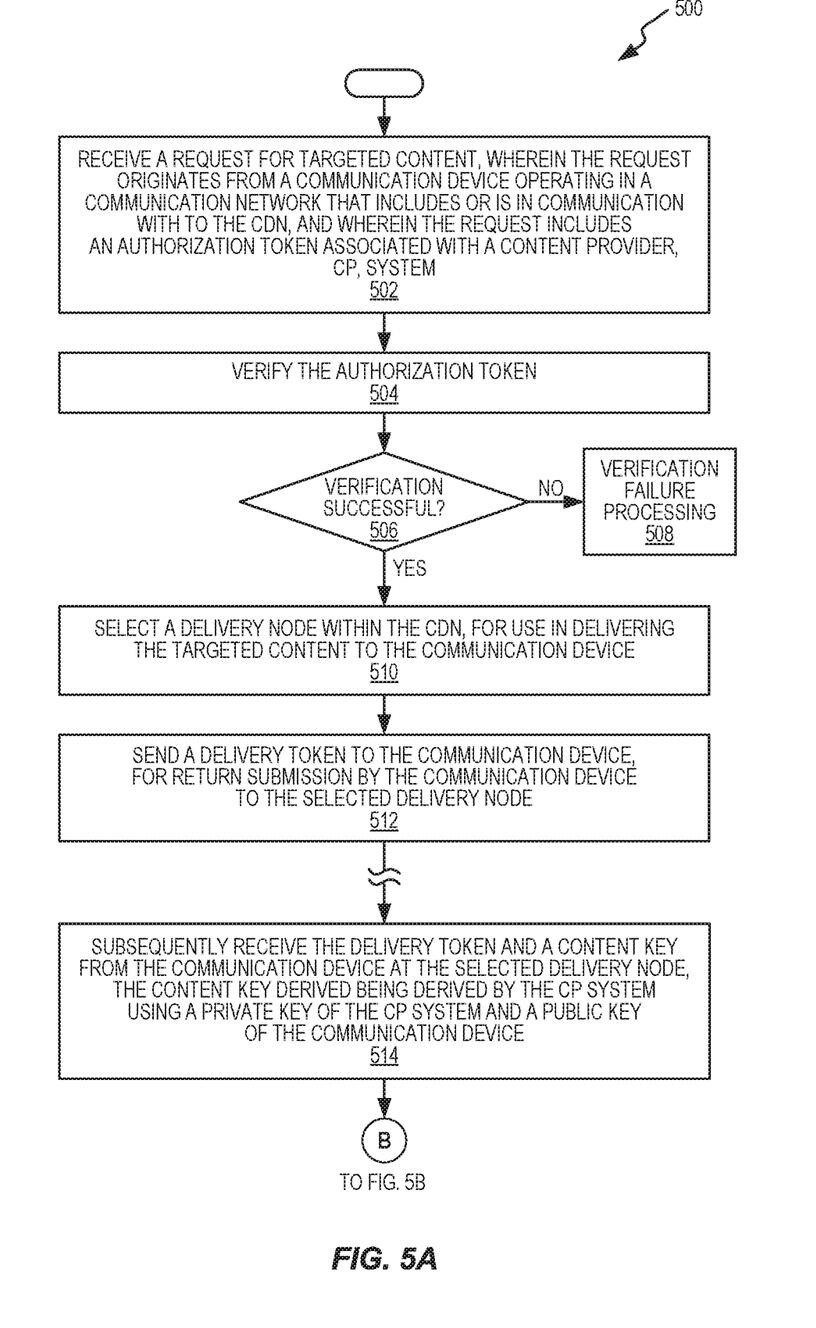
FIGS. 5a and b is a logic flow diagram of one embodiment of a method of processing implemented by a content delivery network, for providing content to a communication device.
Figure 5B:
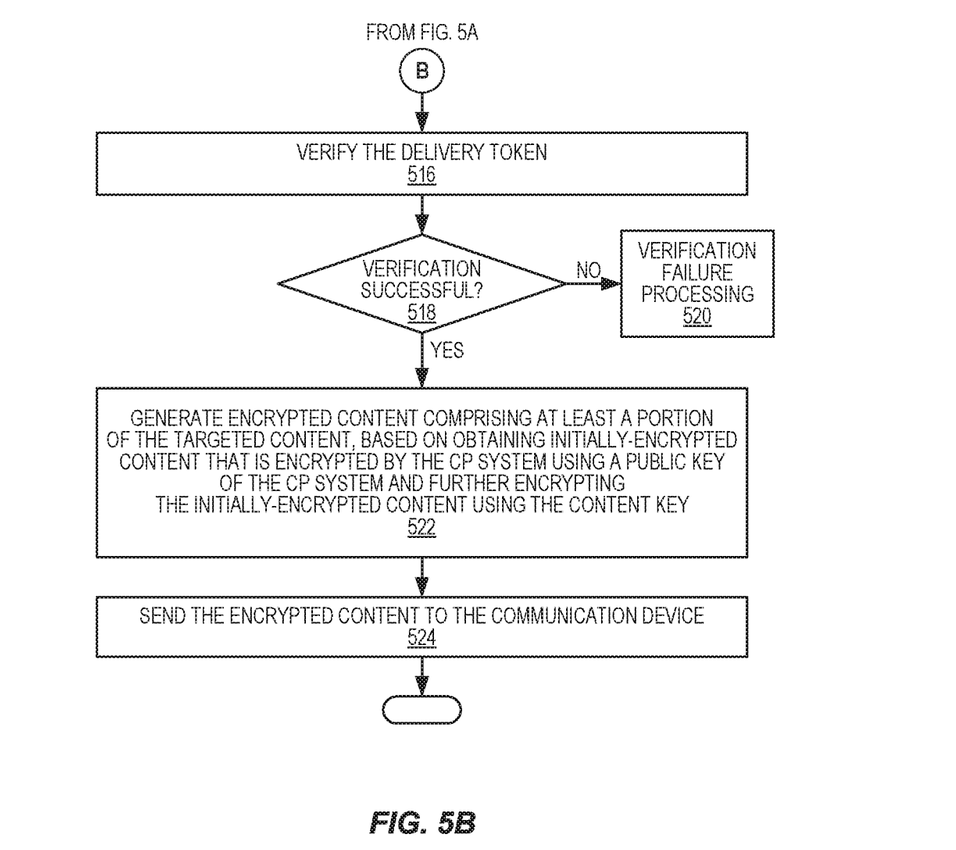

Regardless of its implementation details, the CDN 18 in one or more embodiments is configured to perform a method 500 such as shown in FIG. 5. The method 500 includes receiving a request for targeted content, wherein the request originates from a communication device 10 operating in a communication network 12 that includes or is in communication with the CDN 18, and wherein the request includes an authorization token associated with a CP system 14 (Block 502). The method 500 also includes verifying the authorization token (Block 504.) In some cases, the CP system 14 generates the authorization token using a first shared secret shared between the CDN 18 and the CP system 14. In these cases, verifying the authorization token comprises using the first shared secret to verify the authorization token. It is determined whether verification is successful (Block 506). If not successful, the verification failure is processed (Block 508).

If verification is successful, the method 500 includes selecting a DN 50 within the CDN 18, for use in delivering the targeted content to the communication device 10 (Block 510) and sending a delivery token to the communication device 10, for return submission by the communication device 10 to the selected DN 50 (Block 512). Selecting the selected DN 50 may include performing a proximity-based selection, based on evaluating corresponding delivery paths between the communication device 10 and respective ones of two or more DNs 50 within the CDN 18. Selecting the DN 50 may also include performing a content-based selection, based on at least one of: determining which one or ones among the two or more DNs 50 are authorized or otherwise provisioned for delivering content that originates from the CP system 14 and determining which one or ones among the two or more DNs 50 are known to have local copies of the initially-encrypted content corresponding to the targeted content. Other selection methods known by the persons skilled in the art may also be used.

The method 500 also includes subsequently receiving the delivery token and a content key from the communication device 10 at the selected DN 50, the content key being derived by the CP system 14 using a private key of the CP system 14 and a public key of the communication device 10 (Block 514). At Block 516, the delivery token is verified. It is then determined whether the verification was successful (Block 518). If not, verification failure is processed (Block 520). In some cases, the CDN 18 generates the delivery token using a second shared secret shared between the selected delivery node 50 and a request routing node 40 that handles the request for the targeted content incoming from the communication device 10. Verifying the delivery token comprises the selected delivery node 50 using the second shared secret to verify the delivery token.

If verification is successful, the method 500 includes generating encrypted content comprising at least a portion of the targeted content, based on obtaining initially-encrypted content that is encrypted by the CP system using a public key of the CP system and further encrypting the initially-encrypted content using the content key (Block 522). In some cases, the initially-encrypted content is obtained from a local data store 56 associated with the selected DN 50 when the initially-encrypted content is available from the local data store 56. In other cases, the method 500 includes obtaining the initially-encrypted content from the CP system 14 when the initially-encrypted content is not available from the local data store 56. The method 500 further includes sending the encrypted content to the communication device 10 (Block 524).

Some embodiments provide for an operator to benefit from its access network while delivering the encrypted contents to its service subscribers in a secure way. In such cases, the CP outsources its CDN infrastructure to the operator. A subscriber can benefit by having a good user experience with a solution that preserves its privacy towards the operator. The operator eventually delivers the encrypted files to the user based on the resource availability and latency time in its resources. For example, delivery networks closest to the subscriber or less loaded can be used for content delivery, minimizing the latency for the user. Therefore, the operator cannot read what is downloaded by the subscriber.

In various embodiments, a non-interactive proxy re-encryption scheme is used for PRE. This means the re-encryption key is generated from the private key from the delegator and the public key from the subscriber. Mechanisms for non-interactive proxy re-encryption schemes have been proposed, such as described in a paper titled "Improved Proxy Re-Encryption Schemes with Applications to Secure Distributed Storage" by Giuseppe Ateniese, Kevin Fu, Matthew Green and Susan Hohenberger. *ACM Transactions on Information and System Security* (TISSEC) 9.1 (2006): 1-30. However, in this approach, the blocks are encrypted with a master key, downloaded by the client and transmitted by the client to the access server for re-encryption. The access control then decides to allow access or not based on the previous information provided by the content owner. According to a different approach, as used by some embodiments, the content is not manipulated or transmitted by the subscriber. The subscriber receives the re-encrypted data at the end, but it has no say on what to download and from where. Such decisions are now the responsibility of the CDN, or the DNs and the RR. This means that the operator, though unaware of the content, has control of what to download and from where.

Additionally, a key distribution approach of some embodiments differs from that discussed in the ACM paper in that the encryption keys are not locked with data blocks, and the subscriber transmits its own public key to the CP, which in turn generates the re-encryption key and sends it to the subscriber. In the ACM paper's approach, the content owner sends re-encryption keys to the access control. Mainly, in the approach of various embodiments described herein, the key re-encryption is between the subscriber and the CP, whereas in the ACM paper's approach, the re-encryption is between the CP and the CDN.

In the end, the ACM paper's approach is not adapted for caching the files. As each block is encrypted with a key, this means that once the key for a block is revealed, then the file can be downloaded and decrypted by anyone. This security vulnerability would most probably push the operator to replace the files regularly. In contrast, in the approach of the various embodiments disclosed herein, the same file can be shared among many subscribers, as the file/content is re-encrypted. The presently disclosed techniques are thus better adapted to distributing the same content to different subscribers, as the ACM paper's approach is specific to controlling access to a file stored in an unsecure access server and untrusted storage.

It should be understood that the methods 400 and 500 illustrated in FIGS. 2-5 are examples of the techniques described more fully above. Each of these methods may be modified according to any of the variations and details discussed. The methods illustrated in FIGS. 2-5, and variants thereof, may be implemented using the processing circuits illustrated in FIG. 1, as appropriate, where the processing circuits are configured, e.g., with appropriate program code stored in memory circuits, to carry out the operations described above. While some of these embodiments are based on a programmed microprocessor or other programmed processing element, it will be appreciated that not all of the steps of these techniques are necessarily performed in a single microprocessor or even in a single module. Embodiments of the presently disclosed techniques further include computer program products for application in a wireless terminal as well as corresponding computer program products for application in a base station apparatus or other network node apparatus.

This program code or computer program instructions may also be stored in a non-transitory and tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) running on a processor such as a digital signal processor, which may collectively be referred to as "circuitry," "a module" or variants thereof.

It will further be appreciated that various aspects of the above-described embodiments can be understood as being carried out by functional "modules", which may be program instructions executing on an appropriate processor circuit, hard-coded digital circuitry and/or analog circuitry, or appropriate combinations thereof.

For example, FIG. 6 illustrates an example functional module or circuit architecture as may be implemented in a communication device 10, e.g., based on the processing circuitry 26 and the storage 28. The illustrated embodiment at least functionally includes a content request module 602 for sending a content request to a CP system 14 reachable via the communication network 12, the content request identifying targeted content and including a public key of the communication device 10. The implementation includes a content key module 604 for receiving a response from the CP system 14 that identifies a CDN 18 and includes an authorization token and a content key that is derived from the public key of the communication device 10 and a private key of the CP system 14. The implementation includes a delivery token module 606 for sending the authorization token to the CDN 18 and correspondingly receiving a delivery token and an address of a DN 50. The implementation includes a content module 608 for sending the delivery token and the content key to the DN 50 and correspondingly receiving encrypted content from the DN 50, the encrypted content comprising at least a portion of the targeted content as initially encrypted by the CP using a public key of the CP, and as further encrypted by the CDN 18 using the content key provided by the communication device 10. The implementation also includes a decryption module 610 for decrypting the encrypted content using a private key of the communication device 10, to obtain decrypted content for media playback at the communication device 10.

FIG. 7 illustrates an example functional module or circuit architecture as may be implemented in a CDN 18, e.g., based on the processing circuitry 44, 54 and storage 56. The illustrated embodiment at least functionally includes a content request module 702 for receiving a request for targeted content, wherein the request originates from a communication device 10 operating in a communication network 12 that includes or is in communication with the CDN 18, and wherein the request includes an authorization token associated with a CP system 14. The implementation also includes a delivery token module 704 for verifying the authorization token and, conditioned upon verification of the authorization token: selecting a DN 50 within the CDN 18, for use in delivering the targeted content to the communication device 10, and sending a delivery token to the communication device 10, for return submission by the communication device 10 to the selected DN 50. The implementation further includes a content module 706 for subsequently receiving the delivery token and a content key from the communication device 10 at the selected delivery node 50, the content key being derived by the CP system 14 using a private key of the CP system 14 and a public key of the communication device 10, verifying the delivery token and, conditioned upon verification of the delivery token: generating encrypted content comprising at least a portion of the targeted content, based on obtaining initially-encrypted content that is encrypted by the CP system 14 using a private key of the CP system 14 and a public key of the communication device 10 and further encrypting the initially-encrypted content using the content key, and sending the encrypted content to the communication device 10.

Modifications and other variants of the described embodiment(s) will come to mind to one skilled in the art having the benefit of the teachings presented in the foregoing descriptions and the associated figures. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

What is claimed is:

1. A method of operation implemented by a communication device configured for operation in a communication network, the method comprising:
    sending a content request to a Content Provider (CP) system reachable via the communication network, the content request identifying targeted content and including a public key of the communication device;
    receiving a response from the CP system, the response identifying a Content Delivery Network (CDN) and including an authorization token and a content key that is derived from the public key of the communication device and a private key of the CP system;
    sending the authorization token to the CDN and correspondingly receiving a delivery token and an address of a delivery node;
    sending the delivery token and the content key to the delivery node and correspondingly receiving encrypted content from the delivery node, the encrypted content comprising at least a portion of the targeted content as initially encrypted by the CP using a public key of the CP, and as further encrypted by the CDN using the content key provided by the communication device; and
    decrypting the encrypted content using a private key of the communication device, to obtain decrypted content for media playback at the communication device.

2. The method of claim 1, wherein sending the content request to the CP system comprises performing a public key exchange with the CP system and correspondingly establishing a secure connection to the CP system, and sending the content request over the secure connection to the CP system.

3. The method of claim 1, wherein sending the delivery token and the content key to the delivery node comprises establishing a secure connection to the delivery node, and sending the delivery token and the content key over the secure connection to the delivery node.

4. The method of claim 1, wherein the CP system packages the targeted content as one or more Content Management Objects (CMOs) each CMO being separately encrypted by the CP system and having a corresponding authorization token, content key, and delivery node association, and wherein the method includes sending the authorization token and the delivery token on a per-CMO basis.

5. The method of claim 1, wherein the communication device comprises a wireless communication device configured for operation in a Public Land Mobile Network (PLMN).

6. A communication device configured for operation in a communication network, the communication device comprising:
    communication interface circuitry configured to send signals to the communication network and receive signals from the communication network; and
    processing circuitry operatively associated with the communication interface and configured to:
        send a content request to a Content Provider (CP) system reachable via the communication network, the content request identifying targeted content and including a public key of the communication device;
        receive a response from the CP system, the response identifying a Content Delivery Network (CDN) and including an authorization token and a content key that is derived from the public key of the communication device and a private key of the CP system;

send the authorization token to the CDN and correspondingly receive a delivery token and an address of a delivery node;

send the delivery token and the content key to the delivery node and correspondingly receive encrypted content from the delivery node, the encrypted content comprising at least a portion of the targeted content as initially encrypted by the CP using a public key of the CP, and as further encrypted by the CDN using the content key provided by the communication device; and decrypt the encrypted content using a private key of the communication device, to obtain decrypted content for media playback at the communication device.

7. The communication device of claim 6, wherein the processing circuitry is configured to send the content request to the CP system by performing a public key exchange with the CP system and correspondingly establishing a secure connection to the CP system, and sending the content request over the secure connection to the CP system.

8. The communication device of claim 6, wherein the processing circuitry is configured to send the delivery token and the content key to the delivery node by establishing a secure connection to the delivery node, and sending the delivery token and the content key over the secure connection to the delivery node.

9. The communication device of claim 6, wherein the CP system packages the targeted content as one or more Content Management Objects (CMOs) each CMO being separately encrypted by the CP system and having a corresponding authorization token, content key, and delivery node association, and wherein the processing circuitry is configured to send the authorization token and the delivery token on a per-CMO basis.

10. The communication device of claim 6, wherein the communication device comprises a wireless communication device configured for operation in a Public Land Mobile Network (PLMN).

11. A method of operation in a Content Delivery Network (CDN), the method implemented by one or more nodes of the CDN and comprising:

receiving a request for targeted content, wherein the request originates from a communication device operating in a communication network that includes or is in communication with the CDN, and wherein the request includes an authorization token associated with a Content Provider (CP) system;

verifying the authorization token and, conditioned upon verification of the authorization token:

selecting a delivery node within the CDN, for use in delivering the targeted content to the communication device;

sending a delivery token to the communication device, for return submission by the communication device to the selected delivery node;

subsequently receiving the delivery token and a content key from the communication device at the selected delivery node, the content key being derived by the CP system using a private key of the CP system and a public key of the communication device; and verifying the delivery token and, conditioned upon verification of the delivery token:

generating encrypted content comprising at least a portion of the targeted content, based on obtaining initially-encrypted content that is encrypted by the CP system using a public key of the CP system and further encrypting the initially-encrypted content using the content key; and sending the encrypted content to the communication device.

12. The method of claim 11, wherein obtaining the initially-encrypted content comprises obtaining the initially-encrypted content from a local data store associated with the selected delivery node when the initially-encrypted content is available from the local data store, and obtaining the initially-encrypted content from the CP system when the initially-encrypted content is not available from the local data store.

13. The method of claim 11, wherein selecting the selected delivery node comprises performing a proximity-based selection, based on evaluating corresponding delivery paths between the communication device and respective ones of two or more delivery nodes within the CDN.

14. The method of claim 13, wherein selecting the selected delivery node further comprises performing a content-based selection, based on at least one of: determining which one or ones among the two or more delivery nodes are authorized or otherwise provisioned for delivering content that originates from the CP system; and determining which one or ones among the two or more delivery nodes are known to have local copies of the initially-encrypted content corresponding to the targeted content.

15. The method of claim 11, wherein the CP system generates the authorization token using a first shared secret shared between the CDN and the CP system, and wherein verifying the authorization token comprises using the first shared secret to verify the authorization token.

16. The method of claim 11, wherein the CDN generates the delivery token using a second shared secret shared between the selected delivery node and a request routing node that handles the request for the targeted content incoming from the communication device, and wherein verifying the delivery token comprises the selected delivery node using the second shared secret to verify the delivery token.

17. The method of claim 11, wherein the operations are performed using a proxy re-encryption (PRE) mechanism, wherein the CDN acts as proxy for the PRE mechanism, and wherein the PRE mechanism utilizes the content key for re-encryption to thereby enable delivery of the targeted content of the CP system to the communication device without exposing the targeted content to the CDN and without exposing the private key of the CP system to the communication device.

18. A Content Delivery Network (CDN) comprising:

first communication interface circuitry configured to receive a request for targeted content, wherein the request originates from a communication device operating in a communication network that includes or is in communication with the CDN, and wherein the request includes an authorization token associated with a Content Provider (CP) system;

first processing circuitry operatively associated with the first communication interface circuitry and configured to verify the authorization token and, conditioned upon verification of the authorization token:

select a delivery node within the CDN, for use in delivering the targeted content to the communication device; and send a delivery token to the communication device, for return submission by the communication device to the selected delivery node;

second communication interface circuitry configured to receive the delivery token and a content key, as subsequently submitted to the CDN by the communication device, the content key being derived by the CP system using a private key of the CP system and a public key of the communication device; and second processing circuitry operatively associated with the second communication interface circuitry and configured to verify the delivery token and, conditioned upon verification of the delivery token:

generate encrypted content comprising at least a portion of the targeted content, based on obtaining initially-encrypted content that is encrypted by the CP system using a public key of the CP system and further encrypting the initially-encrypted content using the content key; and send the encrypted content to the communication device.

19. The CDN of claim 18, wherein the CDN includes a request routing node comprising the first communication interface circuitry and the first processing circuitry, and further includes two or more delivery nodes, one of which is selected by the request routing node as the selected delivery node and includes the second communication interface circuitry and the second processing circuitry.

20. The CDN of claim 18, wherein the second processing circuitry is configured to obtain the initially-encrypted content by obtaining the initially-encrypted content from a local data store associated with the selected delivery node when the initially-encrypted content is available from the local data store, and obtain the initially-encrypted content from the CP system when the initially-encrypted content is not available from the local data store.

21. The CDN of claim 18, wherein the first processing circuitry is configured to select the selected delivery node by performing a proximity-based selection, based on evaluating corresponding delivery paths between the communication device and respective ones of two or more delivery nodes within the CDN.

22. The CDN of claim 21, wherein the first processing circuitry is configured to select the delivery node by further performing a content-based selection, based on at least one of: determining which one or ones among the two or more delivery nodes are authorized or otherwise provisioned for delivering content that originates from the CP system; and determining which one or ones among the two or more delivery nodes are known to have local copies of the initially-encrypted content corresponding to the targeted content.

23. The CDN of claim 18, wherein the CP system generates the authorization token using a first shared secret shared between the CDN and the CP system, and wherein the first processing circuitry is configured to use the first shared secret to verify the authorization token.

24. The CDN of claim 18, wherein the first processing circuitry is configured to generate the delivery token using a second shared secret shared between the selected delivery node and a request routing node that handles the request for the targeted content incoming from the communication device, and wherein the second processing circuitry is configured to use the second shared secret to verify the delivery token.

* * * * *

UNITED STATES PATENT AND TRADEMARK OFFICE
CERTIFICATE OF CORRECTION

PATENT NO. : 10,666,755 B2  
APPLICATION NO. : 15/758203  
DATED : May 26, 2020  
INVENTOR(S) : Zhu et al.

Page 1 of 1

It is certified that error appears in the above-identified patent and that said Letters Patent is hereby corrected as shown below:

On the Title Page

In Item (57), under "ABSTRACT", in Column 2, Line 3, delete "(K PUB)" and insert -- (K_PUB) --, therefor.

In Item (57), under "ABSTRACT", in Column 2, Line 6, delete "(K-NEW)" and insert -- (K_NEW) --, therefor.

In the Drawings

In Fig. 4, Sheet 6 of 8, for Block "406", in Line 1, delete "the CDN" and insert -- the DN --, therefor.

In the Specification

In Column 10, Line 36, delete "(Block 408)." and insert -- (Block 410). --, therefor.

Signed and Sealed this  
Nineteenth Day of January, 2021

Andrei Iancu  
*Director of the United States Patent and Trademark Office*